US008032378B2

(12) United States Patent
Stephens, Jr.

(10) Patent No.: US 8,032,378 B2
(45) Date of Patent: Oct. 4, 2011

(54) CONTENT AND ADVERTISING SERVICE USING ONE SERVER FOR THE CONTENT, SENDING IT TO ANOTHER FOR ADVERTISEMENT AND TEXT-TO-SPEECH SYNTHESIS BEFORE PRESENTING TO USER

(76) Inventor: James H. Stephens, Jr., Austin, TX (US)

(*) Notice: Subject to any disclaimer, the term of this patent is extended or adjusted under 35 U.S.C. 154(b) by 589 days.

(21) Appl. No.: 11/458,150

(22) Filed: Jul. 18, 2006

(65) Prior Publication Data

US 2008/0059189 A1 Mar. 6, 2008

(51) Int. Cl.

| | |
|---|---|
| ***G10L 13/08*** | (2006.01) |
| ***G10L 13/00*** | (2006.01) |
| ***G06F 15/16*** | (2006.01) |
| ***H04M 1/64*** | (2006.01) |

(52) U.S. Cl. ...... 704/260; 704/258; 709/219; 379/88.22

(58) Field of Classification Search .................. 704/258, 704/270; 707/10; 434/350

See application file for complete search history.

(56) References Cited

U.S. PATENT DOCUMENTS

| | | | | |
|---|---|---|---|---|
| 6,557,026 | B1 | 4/2003 | Stephens, Jr. | 709/203 |
| 6,609,146 | B1 * | 8/2003 | Slotznick | 709/200 |
| 6,874,018 | B2 * | 3/2005 | Wu | 709/219 |
| 2003/0219708 | A1 * | 11/2003 | Janevski et al. | 434/350 |
| 2006/0116881 | A1 * | 6/2006 | Umezawa et al. | 704/270 |
| 2007/0100836 | A1 * | 5/2007 | Eichstaedt et al. | 707/10 |

OTHER PUBLICATIONS

Stephens, James H. Jr. "System and Apparatus for Dynamically Generating Audible Notices From an Information Network" U.S. Appl. No. 09/409,000, filed Sep. 29, 1999, now abandoned (27 pages).

* cited by examiner

*Primary Examiner* — Talivaldis Ivars Smits
*Assistant Examiner* — Farzad Kazeminezhad
(74) *Attorney, Agent, or Firm* — Hamilton & Terrile, LLP; Robert W. Holland

(57) ABSTRACT

Methods and systems for providing a network-accessible text-to-speech synthesis service are provided. The service accepts content as input. After extracting textual content from the input content, the service transforms the content into a format suitable for high-quality speech synthesis. Additionally, the service produces audible advertisements, which are combined with the synthesized speech. The audible advertisements themselves can be generated from textual advertisement content.

15 Claims, 2 Drawing Sheets

CONTENT AND ADVERTISING SERVICE USING ONE SERVER FOR THE CONTENT, SENDING IT TO ANOTHER FOR ADVERTISEMENT AND TEXT-TO-SPEECH SYNTHESIS BEFORE PRESENTING TO USER

BACKGROUND OF THE INVENTION

1. Field of the Invention

The present invention relates to synthesizing speech from textual content. More specifically, the invention relates to a method and system for a speech synthesis and advertising service.

2. Description of the Related Art

Text-to-speech (TTS) synthesis is the process of generating natural-sounding audible speech from text, and several TTS synthesis systems are commercially available. Some TTS applications are designed for desktop, consumer use. Others are designed for telephony applications, which are typically unable to process content submitted by consumers. The desktop TTS applications suffer from typical disadvantages of desktop-installed software. For example, the applications need to be installed and updated. Also, the applications consume desktop computing resources, such as disk space, random access memory, and CPU cycles. As a result, these host computers might need more resources than they would otherwise, and smaller devices, such as personal digital assistants (PDA's), currently are usually incapable of running TTS applications that produce high-quality audible speech.

TTS application developers often write the software to run on a variety of host computers, which support different hardware, drivers, and features. Targeting multiple platforms increases development costs. Also development organizations typically need to provide installation support to users who install and update their applications.

SUMMARY OF THE INVENTION

These challenges create a need for a TTS service delivered via the Internet or other information networks, including various wireless networks. A network-accessible TTS service reduces the computational resource requirements for devices that need TTS services, and users do not need to maintain any TTS application software. TTS service developers can target a single platform, and that simplification reduces development, and deployment costs significantly.

However, a TTS service introduces challenges of its own. These challenges include designing and deploying for multiuser use, security, scalability, network and server costs, and other factors. Paying for the service is also an obvious challenge. Though fee-based subscriptions or pay-as-you-go approaches are occasionally feasible, customers sometimes prefer to accept advertisements in return for free service. Also, since a network-accessible TTS service makes TTS synthesis available to a larger number of users on wider range of devices, a TTS service could potentially see a wider variety of types of input content. As a result, the TTS service should be able to process many different types of input while still providing high-quality, natural synthesized speech output.

Therefore, there is a need for an advertisement-supported, network-accessible TTS service that generates high-quality audible speech from a wide variety of input content. In accordance with the present invention, a method and system are provided which substantially reduce the disadvantages and problems associated with previous methods and systems for providing high-quality speech synthesis of a wide variety of content types to a wide range of devices.

The present invention provides TTS synthesis as a service with several innovations including content transformations and integrated advertising. The service synthesizes speech from content, and the service also produces audible advertisements. These audible advertisements are typically produced based on the content or other information related to the user submitting the content to the service. Advertisement production can take the form of obtaining advertising content from either an external or internal source. The service then combines the speech with the audible advertisements.

In some embodiments, some audible advertisements themselves are generated from textual advertisement content via TTS synthesis utilizing the service's facilities. With this approach, the service can use existing text-based advertising content, widely available from advertising services today, to generate audible advertisements. One advantage of this approach is that existing advertisement services do not need to alter their interfaces to channel ads to TTS service users.

Textual transformation is essential for providing high-quality synthesized speech from a wide variety of input content. Without appropriate transformation, the resulting synthesized speech will likely mispronounce many words, names, and phrases, and it could attempt to speak irrelevant markup and other formatting data. Other errors can also occur. Various standard transformations and format-specific transformations minimize or eliminate this undesirable behavior while otherwise improving the synthesized speech.

Some of the transformation steps may include determination of likely topics related to the content. Those topics facilitate selection of topic-specific transformation rules. Additionally, those topics can facilitate the selection of relevant advertisements.

DETAILED DESCRIPTION

In the description that follows, the present invention will be described in reference to embodiments that provide a network-accessible TTS service. More specifically, the embodiments will be described in reference to processing content, generating audible speech, and producing audible advertisements. However, the scope of the invention is not limited to any particular environment, application, or specific implementation. Therefore, the description of the embodiments that follows is for purposes of illustration and not limitation.

Figure 1:
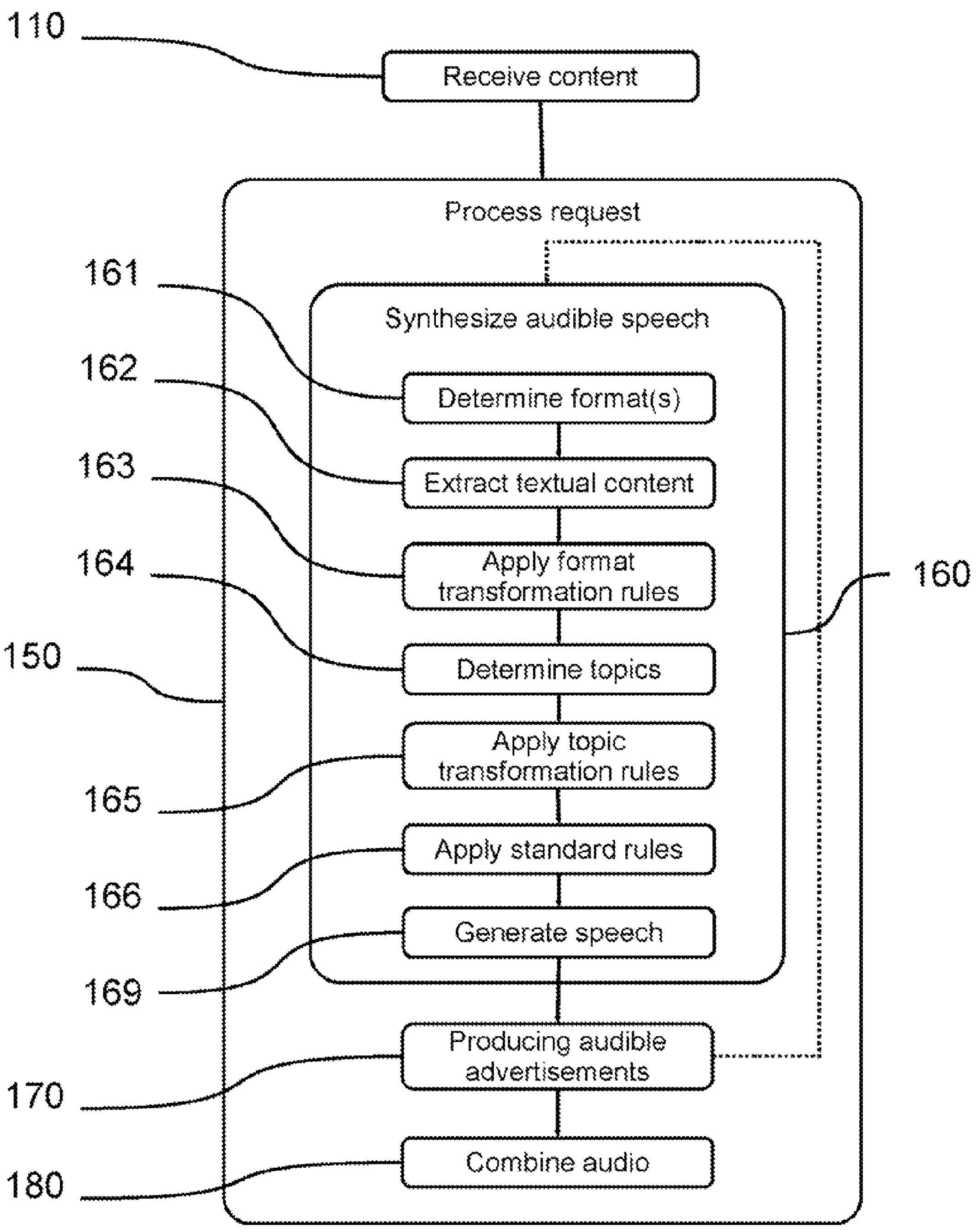
FIG. 1 is a flow chart illustrating steps performed by an embodiment of the present invention.

FIG. 1 is a flow chart illustrating steps performed by an embodiment of a TTS service in accordance with the present invention. First the service receives content in step 110 via an information network. In some embodiments, the information network includes the Internet. In these and other embodiments, the networks include cellular phone networks, 802.11x networks, satellite networks, Bluetooth connectivity, or other wireless communication technology. Other networks, combinations of networks, and network topologies are possible. Since the present invention is motivated in part by a desire to bring high-quality TTS services to small devices, including PDA's and other portable devices, wireless network support is an important capability for those embodiments.

The protocols for receiving the content over the information network depend to some extent on the particular information network utilized. The type of content is also related to transmission protocol(s). For example, in one embodiment, content in the form of text marked up with HTML is delivered via the HyperText Transport Protocol (HTTP) or its secure variant (HTTPS) over a network capable of carrying Transmission Control Protocol (TCP) data. Such networks include wired networks, including Ethernet networks, and wireless networks, including cellular networks, IEEE 802.11x networks, and satellite networks. Some embodiments utilize combinations of these networks and their associated high-level protocols.

The content comprises any information that can either he synthesized into audible speech directly or after intermediate processing. For example, content can comprise text marked up with a version of HTML (HyperText Markup Language). Other content formats are also possible, including but not limited to Extensible Markup Language (XML) documents, plain text, word processing formats, spreadsheet formats, scanned images (e.g., in the TIFF or JPEG formats) of textual data, facsimiles (e.g., in TIFF format), and Portable Document Format (PDF) documents. For content in the form of a graphical representation of text (e.g., facsimile images), some embodiment perform a text recognition step to extract textual content from the image. Then embodiment then further processes that extracted text.

In many embodiments, the service also receives input parameters that influence how the content, is processed by the service. Possible parameters relating to speech synthesis include voice preferences (e.g., Linda's voice, male voices, gangster voices), speed of speech (e.g., slow, normal, fast), output format (e.g., MP3, Ogg Verbis, WMA), prosody model (s) (e.g., newscaster or normal), and information relating to the identity of the content submitter, and billing information. Other parameters are also possible.

In some embodiments, the content is provided by a source that it received the content from another source. In other words, in these embodiments, the TTS service does not receive the content directly from the original publisher of the content. Aside from the common rationales for distributed systems, a primary motivation for this step in these embodiments is consideration of possible copyright or other terms of use issues with content. In some circumstances a TTS service might violate content use restrictions if the service obtains the content directly from the content publisher and subsequently delivers speech synthesized from that content to a user. In contrast, a method that routes content through the user before delivery to the TTS service could address certain concerns related to terms of use of the content. For example, if some content's use restrictions prohibits redistribution, then direct route of content from the content provide to the TTS service could be problematic. Instead, embodiments receiving content indirectly may have advantages over other systems and methods with respect to content use restrictions. In particular, a method that maintains the publisher's direct relationship with its ultimate audience can be preferable. Of course, the specific issues related to particular content use restrictions vary widely. Embodiments that receive content indirectly do not necessarily address all possible content use issues, and this description does not provide specific advice or analysis in that regard.

Once the service receives the content, the service processes it in step 150, which comprises two main substeps: synthesizing speech in step 160 and producing audible advertisements in step 170. Finally, typical embodiments combine, store, and/or distribute the results of these two steps in step 180. The speech synthesis step 160 and the production of audible advertisements in step 170 can be performed in either order or even concurrently. However, many embodiments will use work performed during the speech synthesis step 160 to facilitate the production of advertisements in step 170. As a consequence, those embodiments perform some of the speech synthesis tasks before completing the production of advertisements in step 170.

FIG. 1 illustrates steps 161, 162, 163, 164, 165, and 166, which some embodiments do not perform. However, most embodiments will execute at least one of these optional preliminary steps. Step 169, the actual generation of spoken audio, which can comprise conventional, well-known text-to-speech synthesis, is always executed in some form either directly or indirectly. The purpose of this processing is to prepare text, perhaps using a speech synthesis markup language, in an appropriate format suitable for input to the text-to-speech synthesis engine in order to generate very high quality output. Potential benefits include but are not limited to more accurate pronunciation, avoidance of synthesis of irrelevant or confusing text, and more natural prosody. Though this processing is potentially computationally intensive, it yields significant benefits over services that perform little or no transformation of the content.

Much of the execution of the substeps of step 160 preceding substep 169 can be considered to be content transformation. In turn, these transformations can be considered as processes consisting of the production and application of transformation rules, some of which are format- or topic-specific. In some embodiments, many rules take the following form:

context: lhs→rhs where lhs can be a binding extended regular expression and rhs can be a string with notation for binding values created when the lhs matches some text. The form lhs can include pairs of parentheses that mark binding locations in lhs, and Sn's in rhs are bound to the bindings in order of their occurrences in lhs. Context is a reference to or identifier for formats, topics, or other conditions. For normalization or standard rules, whose applicability is general, context can be omitted or null.

In addition, some embodiments use tag transformation rules for content in hierarchical formats such as HTML or XML. These rules indicate how content marked with a given tag (perhaps with given properties) should be transformed. Some embodiments operate primarily on structured content, such as XML data, while others operate more on unstructured or semi-structured text. A typical embodiment uses a mix of textual and structured transformations.

In some embodiments at a given transformation step, a set of rules is applied repeatedly until a loop is detected or until no rule matches. Such a procedure is a fixed-point approach. Rule application loops can execute in several ways. For example, a simple case occurs when then application of a rule generates new text that will result in a subsequent match of that rule. Depending on the expressiveness of an embodiment's rule language and the rules themselves, not all loops are detectable.

In other embodiments, rules are applied to text in order, with no possibility for loops. For a given rule, a match in the text will result in an attempt at matching that rule starting at the end of the previous match. Such a procedure is a progress-based approach. Typical embodiments use a combination of fixed-point and progress-based approaches.

In many embodiments, step 160 includes some normalization. Normalization typically has two goals: cleaning, which is removing immaterial information, and canonicalization, which comprises reorganizing information in a canonical form. However, in practice many embodiments do not distinguish cleaning from canonicalization. Some cleaning can be considered canonicalization and vice versa. This normalization process, which can occur throughout step 160, removes extraneous text, including redundant whitespace, irrelevant formatting information, and other inconsequential markup, to facilitate subsequent processing. Rules that operate on normalized content typically can be simpler than rules which must consider distinct but equivalent input. A simple normalization example is removing redundant spaces that would not impact speech synthesis. One such normalization rule could direct that more than two consecutive spaces are collapsed into just two spaces:

‘+’→’"

Normalization can also be helpful in determining if a previously computed result is appropriate for reuse in an equivalent content. Such reuse is discussed below in more detail.

In most embodiments, the first substep in step 160 is to determine one or more formats of the content. For given content, multiple formats in this sense are possible. For example, if the content is textual data, one “format” is the encoding of characters (e.g., ISO 8859-1, UNICODE, or others). ISO 8859-1 content might be marked up with HTML, which can also be considered a format in this processing. Furthermore, this example content could be further formatted, using HTML, in accordance with a particular type of page layout. Embodiments that attempt to determine content formats typically use tests associated with known formats. In some embodiments, these tests are implemented with regular expressions. For example, one embodiment uses the following test “<html>(.*)</html>”s→HTML to determine if the given content is likely (or, more precisely, contains) HTML.

Some content can have different formats in different parts. For example, a word processing document could contain segments of plain text in addition to sections with embedded spreadsheet data. Some embodiments would therefore associate different formats with those different types of data in the content.

Depending on the type of content, step 162, the extraction of textual content from the content, might be very simple or even unnecessary. However, since many embodiments are capable of processing a wide variety of content into high-quality speech, some extraction of textual content is typical. The primary goal of this step is to remove extraneous information that is irrelevant or even damaging in subsequent steps. However, in some cases, textual content is not immediately available from the content itself. For example, if the input content includes a graphical representation of textual information, this extraction can comprise conventional character recognition to obtain that textual information. For example, a scanned image of a newspaper article or a facsimile (for example as encoded as TIFF image) of a letter are graphical representations of textual information. For such graphical representations, text extraction is necessary.

Information about the format(s) of content can facilitate text extraction. For example, knowing that some content is a spreadsheet can aid in the selection of the appropriate text extraction procedure. Therefore, many embodiments perform step 161 before step 162. However, some embodiments determine content formats iteratively, with other steps interspersed. For example, one embodiment performs an initial format determination step to enable text extraction. Then this embodiment performs another format determination step to gain more refined formatting information.

Once the formats are determined and text is extracted, the service applies zero or more transformation rules. Throughout this process, the service can normalize the intermediate or final results.

After step 162, typical embodiments apply zero or more format transformations in step 163, which transform some of the text in order to facilitate accurate, high-quality TTS synthesis. In many embodiments, this transformation is based on one or more format rules. For example, some content's HTML text could have been marked as italicized with ‘I’ tags:

I wouldn't talk to you if you were the <i>last</i> person on Earth.

If step 169 (or a preceding one) understands the tag ‘EMPH’ to mean that the marked text is to be emphasized during speech generation, a particular embodiment would translate the HTML ‘I’ tags to ‘EMPH’ tags:

I wouldn't talk to you if you were the <emph>last</emph> person on Earth.

This example has used an example format transformation rule that could be denoted by

HTML: I→EMPH to indicate that (a) the rule is for text formatted with HTML (of any version) and (b) text tagged with ‘I’, notation potentially specific to the input format, should be retagged with ‘EMPH’, a directive that the speech generation step, or a step preceding that step, understands. Alternately, if step 169 does not understand an ‘EMPH’ tag, the transformation could resort to lower-level speech synthesis directives that achieve similar results. For example, the directives for emphasis could comprise lower speech at a higher average pitch. As a further alternative, an embodiment could transform the ‘I’ tags to ‘EMPH’ tags and subsequently transform those ‘EMPH’ tags to lower-level speech synthesis directives.

A similar approach could be used for other markup, indications, or notations in the text that could correspond to different prosody or other factors relating to speech. For example, bold text could also be marked to be emphasized when spoken. Other formatting information can be translated into TTS synthesis directives. More sophisticated format transformation rules are possible. Some embodiments use extended regular expressions to implement certain format transformation rules.

Next, typical embodiments attempt to determine zero or more topics that pertain to the content in step 164. Some topics utilize particular notations, and the nest step 165 can transform those notations, when present in the text, into a form that step 169 understands. For example, some content could mention “camera” and “photography” frequently. In step 165, a particular embodiment would then utilize a topic-specific pronunciation rule directing text of the form “fn”, where ‘n’ is a number, to be uttered as “f-stop of n”. These rules, associated with specific topics, are topic transformation rules. To support these transformations, embodiments map content to topics and topics to pronunciation rules. In a typical embodiment, the content-to-topic map is implemented based on keywords or key phrases. In these cases, keywords are associated with one or more topics.

“camera” “photography” “lens”→Photography Topic

In some embodiments, topics are associated with zero or more other topics:

Photography Topic
→Art Topics
→Optics Topic
→Consumer Electronics Topic

When content contains keywords that are associated, directly or indirectly, with two or more topics, some embodiments use the topic whose keywords occur most frequently in the content. As a refinement, another embodiment has a model of expectations of keyword occurrence. Then such an embodiment tries the topic that contains keywords that occur more than expected relative to the statistics for other topics' keywords in the content. Alternately or in addition, other embodiments consider the requesting user's speech synthesis request history when searching for applicable topics. Additionally, some embodiments consider the specificity of the candidate topics. Furthermore, the embodiment can then evaluate the pronunciation rules for candidate topics. If the rules for a given topic apply more frequently to the content that those for other topics, then that topic is a good candidate. A single piece of content, could relate to multiple topics. Embodiments need not force only zero or one association. Obviously many more schemes for choosing zero or more related topics are possible.

Once related topics are chosen, their pronunciation or other transformation roles are applied in step 165 to transform the content as directed. The rules can take many forms. In one embodiment, some rules can use extended regular expressions. For example "\s[fF]([0-9]+(\.[0-9][0-9]?))"→"F stop of $1"

where '$1' on the right-hand side of the rule is bound to the number following the 'f' or 'F' in matching text.

The next step, step 166, is the application of standard transformation rules. This processing involves applying standard rules that are appropriate for any text at this stage of processing. This step can include determining if the text included notation that the target speech synthesis engine does not by itself know how to pronounce. In these cases, an embodiment transforms such notation into a format that would enable speech synthesis to pronounce the text correctly. Additionally or in the alternative, some embodiments augment the speech synthesis engine's dictionary or roles to cover the notation. Abbreviations are a good example. Say the input text included the characters "60 mpg". The service might elect to instruct the speech synthesis engine to speak "60 miles per gallon" instead of, say, "60 M P G". Punctuation can also generate speech synthesis directives. For example, some embodiments will transform two consecutive dashes into a TTS synthesis directive that results in a brief pause in speech:

"--"→"<pause length="180 ms">"

Finally, at the end of step 160, speech is generated from the processed content in step 169. This step usually comprises conventional text-to-speech synthesis, which produces audible speech, typically in a digital format suitable for storage, delivery, or further processing. The processing leading up to 169 should result in text with annotations that the speech synthesis engine understands.

To the extent that this preprocessing before step 169 uses an intermediate syntax and/or semantics for annotations related to speech synthesis that are not compatible with speech synthesis engine input requirements, an embodiment will perform an additional step before step 169 to translate those annotations as required for speech generation. An advantage of this additional translation step is that the rules, other data, and logic related to transformations can to some extent be isolated from changes in the annotation language supported by the speech generation engine. For example, some embodiments use an intermediate language that is more expressive than the current generation of speech synthesis engines. In some cases, if and when a new engine is available that has greater control over speech generation, the translation step alone could be modified to take advantage of those new capabilities.

In step 170, embodiments produce audible advertisements for the given content. In some embodiments, production comprises receiving advertising content or other information from an external source such as an on-line advertising service. Alternately or in addition, some embodiments obtain advertising content or other advertising information from internal sources such as an advertising inventory. In either case, those embodiments process the advertising content to create the audible advertisements to the extent that the provided advertising content is not already in an audible format. For example, an embodiment could use a prefabricated jingle in addition to speech synthesized from advertising text.

In order to facilitate the production of appropriate advertisements, some embodiments determine zero or more advertisement types for given content. Possible advertisement types relate but are not limited to lengths and styles of advertisements, either independently or in combination. For example, two advertisement types could be sponsorship messages in short and long forms:

Short form: "This service was sponsored by the law offices of Dewey, Cheatam, and Howe." [5 seconds]

Long form: "This service was sponsored by the law offices of Dewey, Cheatam, and Howe, who remind you that money and guns might not be enough. For more information or a free consultation, call Dewey Cheatam today" [15 seconds]

Short-duration generated speech suggests shorter advertisements.

Advertisement types are used primarily to facilitate business relationships with advertisers, including advertising agencies. However, some embodiments do not utilize advertisement types at all. Instead, such an embodiment selects advertisements based on more direct properties of the content, input parameters, or related information. Similar embodiments simply utilize a third-party advertisement service, which uses its own mechanisms for choosing advertising content for given content, internal advertisement inventories, or both.

Based on zero or more advertisement types as well as content and information related to that content, typical embodiments produce zero or more specific advertisements to be packaged with audible speech. In some of these embodiments, this production is based on the source of the content, the content itself, information regarding the requester or requesting system, and other data. One approach uses topics determined in step 164 to inform advertisement production. Another approach is keyword-driven, where advertisements are associated with keywords in the content. For some embodiments, the content is provided in whole or in part by a third-party advertising brokerage, placement service, or advertising service.

For longer text, some embodiments produce different advertisements for different segments of that text. For example, in an article about energy conservation, one section might discuss hybrid cars and another section might summarize residential solar power generation. In the former section, an embodiment could elect to insert an advertisement for a hybrid car. After the latter section, the embodiment could insert an advertisement for a solar system installation contractor.

Part of a user's requesting history can be used in other services. For example, a user's request for speech synthesis of text related to photography can be used to suggest photography-related advertisements for that user via other services, including other Web sites.

Advertisements can take the form of audio, video, text, other graphical representations, or combination thereof, and this advertisement content can be delivered in a variety of manners. In an example embodiment, a simple advertisement comprising a piece of audio is appended to the generated audible speech. In addition, if the user submitted the request for speech synthesis through the embodiment's Web site, the user will see graphical (and textual) advertising content on that Web site.

In some embodiments, the produced audible advertisements are generated in part or in whole by applying step 160 to advertising content. This innovation allows the wide range of existing text-based advertising infrastructure to be reused easily in the present invention.

Combined audio produced in step 180 comprises audible speech from step 169, optionally further processed, as well as zero or more audible advertisements, which themselves can include audible speech in addition to non-speech audio content such as music or other sounds. Additionally some embodiments post-process output audio to equalize the audio output, normalize volume, annotate the audio with information in tags or other formats. Other processing is possible. In some embodiments, the combined audio is not digitally combined into a single file or packaged. Rather it is combined to be distributed together as a sequence of files or streaming sessions.

For long content with different topics associated with different segments of that content, some embodiments combine the speech generated with content and multiple audible advertisements such that advertisements are inserted near their related segments of content.

Finally, in typical embodiments, the output audio may be streamed or delivered whole in one or more formats via various information network. Typical formats for embodiments include compressed digital formats MP3, Ogg Verbis, and WMA. Other formats are possible, both for streaming and packaged delivery. As discussed above, many information networks and topologies are possible to enable this delivery.

Both steps 160 and step 170 can be computationally intensive. As a result, some embodiments utilize caches in order to reuse previous computational results when appropriate.

At many stages in executing step 160, the data being processed could be saved for future association with the output of step 169 in the form of a cached computational result. For example, an embodiment could elect to store the generated speech along with the raw content provided to step 161. If that embodiment later receives a request to process identical content, the embodiment could simply reuse the cached result computed previously, thereby conserving computational resources and responding to the request quickly. For such a cache to operate efficiently, the cache hit ratio, the number of results retrieved from the cache divided by the number of total requests, should be as high as possible. A challenge to high cache hit ratios for embodiments of the present invention is the occurrence of inconsequential yet common differences in content. More generally, a request comprises both content and input parameters, and immaterial yet frequent differences in requests typically result in low cache hit ratios.

Two requests need not be identical to result in identical output. If two requests have substantially the same output, then those requests are considered equivalent. A request signature is a relatively short key such that two inequivalent requests will rarely have the same signature. Some embodiments will cache some synthesized speech after generation. If another equivalent speech synthesis request arrives and if the cached result is still available, the embodiment can simply reuse the cached result instead of recomputing it. Some embodiments use request signatures to speed cache lookup.

Embodiments implement such caches in a wide variety of ways, including file-system based approaches, in-memory stores, and databases. Some caches are not required to remember all entries written to them. In many situations, storage space for a cache could grow without bound unless cache entries are discarded. Cache entries can be retired using a variety of algorithms, including least-frequently-used prioritizations, scheduled cache expirations, cost/benefit calculations, and combinations of these and other schemes. Some schemes consider the cost of the generation of audible speech and the estimated likelihood of seeing an equivalent request in the near future. Low-value results are either not cached or flushed aggressively.

Determining when two nonidentical requests are equivalent is not always easy. In fact, that determination can be infeasible for many embodiments. So embodiments that compute signatures will typically make conservative estimates that will err on the side of inequivalence. As discussed above, additional processing steps often include normalization, processing that removes immaterial information while perhaps rearranging other information in a canonical form. Some embodiments will elect to delay the computation of signatures until just before speech generation in step 169 in order to benefit from such normalization. However, the processing involved in normalization can itself be computationally expensive. As a consequence, some embodiments elect to compute signatures early at the expense of not detecting that a cached result was computed from a previous equivalent request.

Different embodiments choose to generate signatures at different stages of processing. For example, one embodiment writes unprocessed content, annotated with its signature, and its corresponding generated speech to a cache. In contrast, another embodiment waits until step 166 to generate a cache key comprising a signature of the content at that stage of processing. Alternate embodiments write multiple keys to a given cache entry. As processing of a piece of content occurs, cache keys are generated. When step 169 is complete, all cache keys are associated with cache entry containing the output of step 169. When a new request arrives, the cache is consulted at each step where a cache key was generated previously. Computation can halt once a suitable cache entry is located (if at all).

As a simple signature example, the MD5 checksum algorithm can be used to generate request signatures. However, this approach does not provide any normalization. Instead, such a signature is almost just a quick identity test. As a refinement, collapsing redundant whitespace followed by computing the MD5 checksum is an algorithm for computing request signatures that performs some trivial normalization. Much more elaborate normalization is possible.

For simplicity, the above description of cached results focuses on the output of step 169; however, some embodiments cache other data, including the outputs of step 170 and/or step 180.

Processing lengthy content can require considerable time; therefore, some embodiments utilize a scheduler to reorder processing of multiple requests based on factors besides the order that the requests were received.

For example, for a given request, some embodiments might elect to delay speech synthesis until resource utilization is lower than at the time of the request. Similarly an embodiment might delay processing the request until request queue has fewer entries. The pending speech synthesis request would have to wait to be processed, but this approach would enable the service to handle other short-term speech synthesis requests quicker. In some embodiments, the service computes the request signature synchronously with the submission of content in order to determine quickly if a cached result is available. However, some embodiments will instead elect to delay the necessary preprocessing in addition to delaying the actual speech synthesis.

Figure 2:
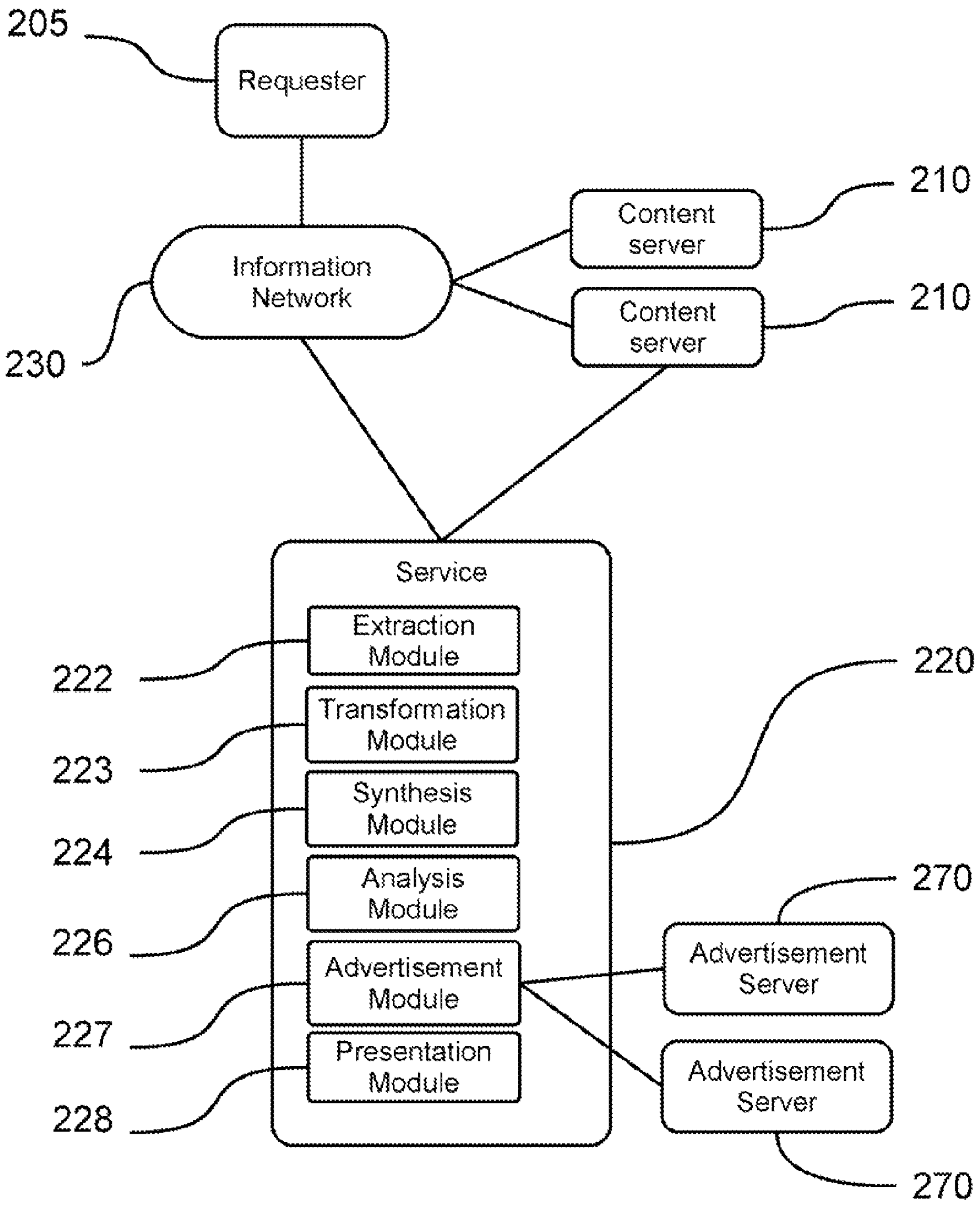
FIG. 2 illustrates a network-accessible TTS system that obtains content from a requesting system that received the content from a second service.

FIG. 2 illustrates a network-accessible speech synthesis service. In the illustrated embodiment, a requester received audible content from a remove speech synthesis service 220, which is accessible via an information network 230. The example embodiment illustrated in FIG. 2 is operable consistent with the steps described in detail above in reference to FIG. 1.

In typical operation, requester 205 receives content from one or more content servers 210. Then the requester 205 sends the content to service 220, which processes the content into audible speech. Service 220 presents the audible speech to requester 205. Alternately, the requester could establish that content flow directly from content servers 210 to service 220. As discussed in more detail above in reference to FIG. 1, the indirect route can have benefits related to content use restrictions; how the direct route typically results in operational economies. Some embodiments allow the requesting user to determine which routes are utilized.

The illustrated example embodiment uses separate, network-accessible advertisement servers 270 as sources for advertising content and content; however, alternate embodiments use advertisement content sources or content servers that are integral to the service. Sources of advertisement content are typically themselves accessible to service 220 via an information network. However, this information network need not provide direct access to information network 230. For example, one embodiment uses a cellular network as information network 230 while the information networks providing connectivity among service 220, content servers 210, and advertisement servers 270 comprises the Internet. Similar embodiments use cellular network services to transport TCP traffic to and from requester 205.

For simplification, FIG. 2 often depicts single boxes for prominent components. However, embodiments for large-scale production typically utilize distinct computational resources to provide even a single function. Such embodiments use "server farms". For example, a preferred embodiment could utilize multiple computer servers to host instances of speech synthesis engine 220. Multiple servers can provide scalability, improved performance, and fault recovery. Such federation of computational resources is also possible with other speech synthesis functions, including but not limited to content input, transformation, and caching. Furthermore, these computational resources can be geographically distributed to reduce round-trip network time to and from requester 205 and other components. In certain configurations, geographical distribution of computers can also support recovery from faults and disasters.

In one embodiment, requesting system 205 is a Web browser with an extension that allows content that is received from one site to be forwarded to a second site. Without some browser extension, typical Web browsers are not operable in this manner automatically due to security restrictions. Alternately, a user can manually send content received by a browser to service 220. In this case, an extension is not required; however, an extension may facilitate the required steps.

As suggested above, in another embodiment, requester 205 is a component of a larger system rather than an end-user application. For example, one embodiment includes a facility to monitor content accessible from content servers 210. When new, relevant content is available from a content server 210, the embodiment sends that content to service 220. This facility then stores the resulting audible speech for later presentation to a user. In this manner, the embodiment incrementally gathers audible speech for new content as the content becomes available. Using this facility, the user can elect to listen to the generated audio either as it becomes available or in one batch.

In some embodiments, requester 205 first obtains content references from one or more network-accessible content reference servers. In some embodiments, a content reference has the form of a Universal Resource Locator (URL) or Universal Resource Identifier (URI) or other standard reference form, and content reference server is a conventional Web server or Web service provider. Alternately or in addition, an embodiment receives content reference from other sources, including Really Simple Syndication (RSS) feeds, served, for example, by a Web server, or via other protocols, formats, or methods.

Requester 205 directs that content referenced by the content reference to be processed by service 220. As discussed above, the content route can be direct, from content server 210 to service 220, or indirect, from content server 210 through requester 205 (or another intermediary) to service 220. Typically the content is sent via HyperText Transport Protocol (HTTP), including its secure variant (HTTPS), on top of Transmission Control Protocol (TCP). In typical embodiments, content servers 210 are conventional Web servers. However, many other transport and content protocols are possible.

As discussed above in more detail, the content is any content that can either be synthesized into audible speech directly or after intermediate processing. The content can comprise text marked up with a version of HTML (HyperText Markup Language). Other content formats are also possible, including but not limited to Extensible Markup Language (XML) documents, plain text, word processing formats, spreadsheet formats, and Adobe's Portable Document Format (PDF). Images of textual content can also be acceptable. In this case, the service would perform text recognition, typically in extraction module 222, to extract textual content from the image. The resulting text is the textual content that the service will process further. This process of transforming input content into textual content is performed in part by extraction module 222.

After extraction of textual content, the service uses transformation module 223 to perform various textual transformations as described in more detail in reference to FIG. 1. These transformations as well as extraction require some analysis, which some embodiments perform with analysis module 226. After textual transformations, the service performs text-to-speech synthesis processing with synthesis module 224.

The advertisement processing typically begins with analysis by analysis module 226 to determine zero or more topics related to the content. Any selected topics can be used to select advertisements. Other data affecting advertisement selection includes the requesting user's request history, user preferences, other user information, information about the content, and other aspects of the content itself. For example, the user's request history could include a preponderance of requests relating to a specific topic. That topic could influence advertisement selection. Some embodiments utilize the user's location, sometimes estimated via the requester's Internet Protocol (IP) address, in order to select advertisements with geographical relevance. Additionally, some embodiments consider the source of the content to influence advertisement selection. For example, content from a photography Web site could suggest photography-related advertisements. Data used for selecting advertisements is known as selection parameters, which can be further processed into selection criteria to guide the specific search for advertisement content.

In typical embodiments, in conjunction with analysis module 226, advertisement module 227 obtains advertising content. The module sends a request for advertisement content to one or more advertisement servers 270 via an information network. Advertisement content can include textual information, which some embodiments can present to the user in a textual format. For example, an advertisement server 270 could provide advertisement information in HTML, which service 220 then presents to the requesting user if possible. Additionally, the advertisement content includes either audible content or content that can be synthesized into audible content. In the latter case, service 220 processes this advertisement content in a manner similar to that for the original input content. In some embodiments, advertisement module 227 selects the advertisement content. In other embodiments, advertisement servers 270 select the advertisement content based on selection criteria. In still other embodiments, advertisement module 227 and advertisement servers 270 work together to select the advertisement content.

In some embodiments, processing related to advertisements is performed concurrently with this textual transformation and speech synthesis. For example, some embodiments perform speech synthesis during advertisement selection. The former typically does not affect the latter.

Finally, presentation module 228 presents audible content to requester 205. At this stage of processing, audible content comprises both audible speech synthesized from input content as well as audible advertising content. These two types of audible content can be ordered according to system parameters, user preferences, relationships between specific advertising content and sections of textual content extracted from input content, or other criteria. For example, one embodiment inserts topic-specific advertisements between textual paragraphs or sections. Another embodiment always provides uninterrupted audible speech followed by a sponsorship message.

Additionally, some embodiments present textual and graphical content along with the audio. For example, some embodiments using a Web browser present the original or processed input content as well as advertisement content in a graphical manner. This advertisement content typically includes clickable HTML or related data.

Some embodiments allow the user to specify if audible content should be delivered synchronously with its availability or, alternately, held for batch presentation. The latter approach resembles custom audio programming comprising multiple segments. In either case, typical embodiments present this audible content via HTTP, User Datagram Protocol (UDP), or similar transport protocols.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the claims below along with their full scope of equivalents.

What is claimed is:

1. A method for generating audible speech from content using an information network, the method comprising:

requesting content at a first location of the information network from a second location of the information network, where said request goes directly from the first location to the second location;

sending the content from the second location to a third location via the information network;

adding advertising information to the content;

synthesizing audible speech from the content at the third location by performing text-to-speech synthesis on the content;

synthesizing advertising audio from the advertising information at the third location by performing text-to-speech synthesis on the advertising information;

combining the audible speech and advertising audio into combined audio; and presenting the combined audio to the requester at the first location via the information network.

2. The method of claim 1 further comprising:

analyzing one or more selection parameters to determine selection criteria and selecting the advertising information using the selection criteria.

3. The method of claim 2, wherein the selection parameters include information about the first location and second location.

4. The method of claim 3, wherein the synthesizing audible speech further comprises using transformation rules comprising topic rules and format rules that consider information about the first location, the second location, topics, a requester's identity, and characteristics of the information network used to deliver the combined audio to the first location.

5. The method of claim 4, wherein the transformation rules, the combining, and the presenting generate multiple audible advertisements inserted near related segments of the audible speech.

6. The method of claim 1, the method further comprising extracting textual content from the content by performing conventional character recognition on the content.

7. The method of claim 1, wherein the presenting considers information related to the first location and the characteristics of the information network used to deliver the combined audio.

8. The system of claim 1, wherein the synthesis module, transformation rules, combination module, and presentation module are operable to generate multiple audible advertisements inserted near their related segments of the audible speech.

9. A system for generating audible speech from content via an information network, the system comprising:

a content module operable to receive content at a first location from a content server at a second location, where the content is received responsive to a request sent directly from the first location to the second location;

an input module operable to send the content to a third location via the information network;

an advertising content module at the third location operable to add advertising information to the content;

a synthesis module at the third location operable to synthesize audible speech from the content and advertising information; and a presentation module operable to present the audible speech at the first location via the information network.

10. The system of claim 9, the system further comprising:

a selection module operable to analyze one or more selection parameters to determine selection criteria and select the advertising information using the selection criteria.

11. The system of claim 10, wherein the selection parameters include information about the first location and second location.

12. The system of claim 9, wherein the synthesis module uses transformation rules comprising topic rules and format rules that consider information about the first location, the second location, topics, the requester's identity, and characteristics of the information network used to deliver the combined audio to the requester.

13. The system of claim 9, the system further comprising an extraction module operable to extract textual content from the content by performing conventional character recognition on the content.

14. The system of claim 9, wherein the presentation module presents the combined audio based on information regarding the first location and characteristics of the information network used to deliver the combined audio to the requester.

15. A method for generating audible speech from content using an information network, the method comprising:

requesting content at a first location of the information network from a second location of the information network, where the request goes directly from the first location to the second location;

sending the content from the second location to a third location via the information network;

extracting topics from the content;

transforming the content based on topic transformation rules and content format rules;

selecting advertising information based on the topics and first location;

adding the advertising information to the content;

synthesizing audible speech from the content at the third location by using text-to-speech synthesis on the content;

synthesizing advertising audio from the advertising information;

combining the audible speech and advertising audio into combined audio; and presenting the combined audio to the requester at the first location via the information network.

* * * * *